United States Patent [19]
Alava

[11] Patent Number: 5,673,766
[45] Date of Patent: Oct. 7, 1997

[54] TRANSMISSION AND STEERING APPARATUS FOR A TRACKED VEHICLE

[76] Inventor: Hannu Alava, FIN-99870, Inari, Finland

[21] Appl. No.: 657,349

[22] Filed: Jun. 3, 1996

Related U.S. Application Data

[63] Continuation of Ser. No. 307,696, Oct. 24, 1994, abandoned.

[30] Foreign Application Priority Data

Mar. 23, 1992 [FI] Finland .................... 921242

[51] Int. Cl.$^6$ .................................... B62D 55/06
[52] U.S. Cl. ................. 180/9.46; 180/9.25; 180/9.5
[58] Field of Search ................. 180/6.7, 9, 9.1, 180/9.25, 9.44, 9.46, 9.5, 184, 186, 190, 192, 252, 267, 193, 400, 447, 448, 449, 262

[56] References Cited

U.S. PATENT DOCUMENTS

| | | | |
|---|---|---|---|
| 1,055,010 | 3/1913 | Zager | 180/267 X |
| 1,252,167 | 1/1918 | Pettit | 180/267 X |
| 1,966,544 | 7/1934 | Dopp | 180/9.1 |
| 2,473,375 | 6/1949 | Hyler | 180/448 |
| 3,061,031 | 10/1962 | Packard | 180/267 X |
| 3,419,097 | 12/1968 | Nodwell et al. | |
| 3,568,786 | 3/1971 | Harsch | |
| 3,680,653 | 8/1972 | Murata et al. | 180/267 X |
| 3,684,044 | 8/1972 | Watson | 180/9.46 |
| 4,415,055 | 11/1983 | Ahn | 180/198 |

FOREIGN PATENT DOCUMENTS 0962726  2/1975  Canada .................... 180/190

OTHER PUBLICATIONS

Derwert's abstract, No. 84-293061/47, week 8447, Abstract of SU, 1079527, Levshin, 15 Mar. 1984.

Patent Abstracts of Japan, vol. 10, No. 323, M-531, abstract of JP-A-61-129376, Mitsuibushi Electric Corp., 17 Jun. 1986.

*Primary Examiner*—Victor E. Johnson
*Attorney, Agent, or Firm*—Pollock, Vande Sande & Priddy

[57] ABSTRACT

A tracked vehicle including a frame. A front track is rotatably attached to front track mounting member(s) connected to the frame with suspension member(s) so as to be movable in a vertical direction in relation to the frame. A vertically extending tubular steering shaft is attached to the front track unit. The steering shaft rotates the front track to steer the tracked vehicle. The steering shaft is connected to the frame with steering shaft mounting member(s) so as to be movable in a vertical direction in relation to the frame. A first gear is provided on the front track and a second gear is provided on the frame. The first gear and the second gear transmit driving power from the frame to the front track. An intermediate shaft extends through the tubular steering shaft from the first gear to the second gear for transmitting the driving power therebetween. The intermediate shaft includes at least two parts movable in relation to each other for lengthening and shortening the intermediate shaft along with relative movements between the front track and the frame.

19 Claims, 2 Drawing Sheets

FIG. 1
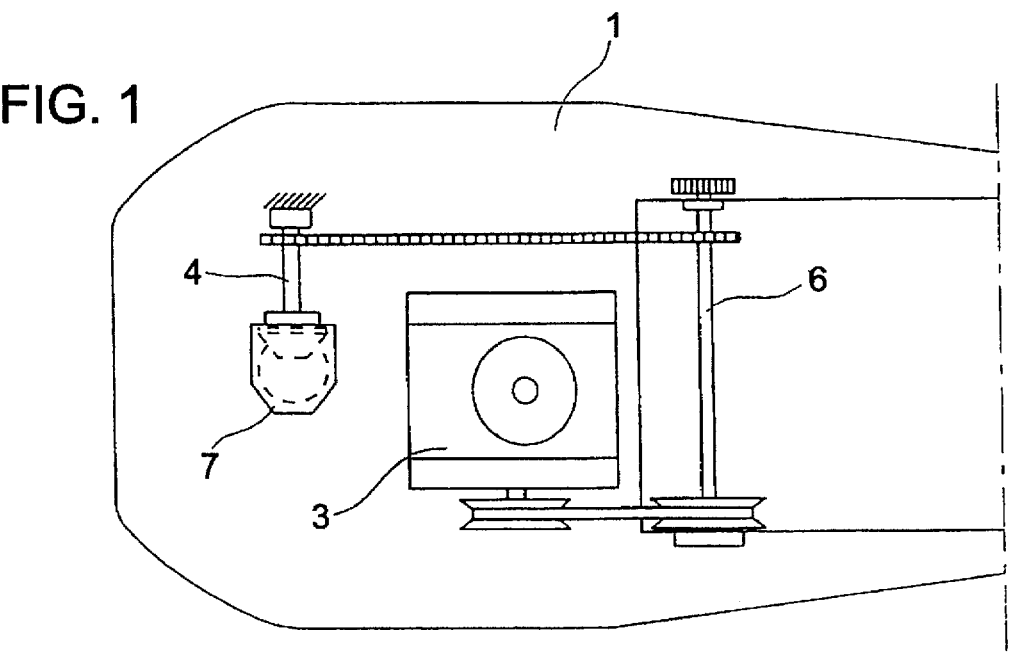
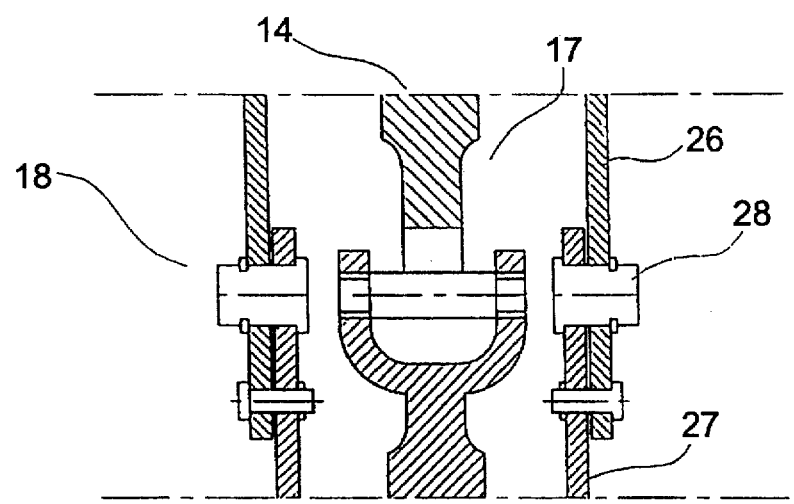
FIG. 3
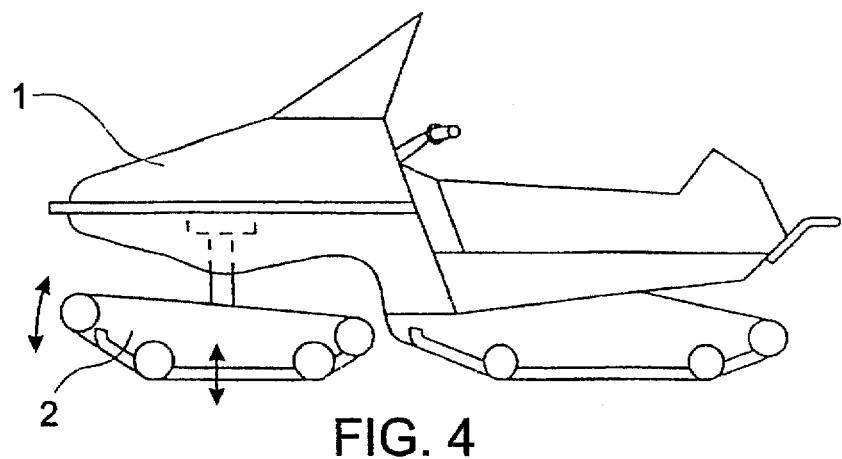
FIG. 4

1

TRANSMISSION AND STEERING APPARATUS FOR A TRACKED VEHICLE

This application is a continuation of U.S. patent application Ser. No. 08/307,696, filed Oct. 24, 1994, now abandoned.

FIELD OF THE INVENTION

The invention relates to transmission and steering apparatus for a tracked vehicle.

BACKGROUND OF THE INVENTION

In a conventional motor sled like that disclosed in the U.S. Pat. No. 3,568,786, the forward driving element is a moving rubber track mat rotated by track wheels. The mat moves on a slide bogie and is located under the seat. Steering of the motor sled occurs by means of a bar that turns the skis or corresponding guide means located in front of the track. The motor sled of this kind has as a transmission device a transmission shaft fixed to a secondary variator (pulley). From one end of the transmission shaft, the torsional force is transmitted by means of a chain to the driving track wheels of the track unit.

A motor sled which has a turning track is also known wherein the steering is accomplished by extending one side of the track and, in a corresponding way, shortening the other side. In addition, there are known motor sleds with two parallel track mats. Both track mats have the same length as the sled. The steering of both track mats occurs by decelerating the rotation of one track mat. Also, a motor sled of this kind has a chain transmission to the driving wheels or the transmission shaft of the track wheels.

It is known to use such a transmission apparatus in tracked vehicles where the rotational motion of the transmission shaft is transmitted through a first bevel gear to an intermediate shaft and further from the intermediate shaft through a second bevel gear to the track unit that drives the tracked vehicle. This kind of solution is presented, for example, in U.S. Pat. No. 4,415,055. The drawback of prior art tracked vehicles and motor sleds, in particular, is their poor steerability and poor suspension. These drawbacks affect the driving characteristics.

SUMMARY OF THE INVENTION

The object of this invention is to obtain a tracked vehicle that has much better steerability than conventional tracked vehicles and that has better driving characteristics. Another object is to obtain an effective suspension of the front part.

By means of the transmission apparatus according to the present invention it is possible to replace the skis in the front of an existing motor sled with a turning track unit that acts as a driving track unit for the tracked vehicle. According to one embodiment of the present invention, the track unit can be connected to the frame of the motor sled by shock absorbers whereby a significant improvement is obtained in the suspension of the track unit. The track unit can also tilt in a plane that is perpendicular to the travel direction. The most important advantage of the invention is that it allows one to replace the skis in existing motor sleds with a turning, spring loaded and shock absorbing front track unit with minor changes and at small costs.

BRIEF DESCRIPTION OF THE DRAWINGS

In the following the present invention will be described in detail with reference to the enclosed drawings in which:

FIG. 1 shows a top view of the transmission apparatus of a motor sled and the bevel gear and the shaft thereof, FIG. 3 is a schematic cross-section at the joint of FIG. 2 taken along the line A—A, and FIG. 4 shows a side view of a motor sled with a front track unit installed.

DETAILED DESCRIPTION OF THE PREFERRED EMBODIMENT(S)

Figure 2:
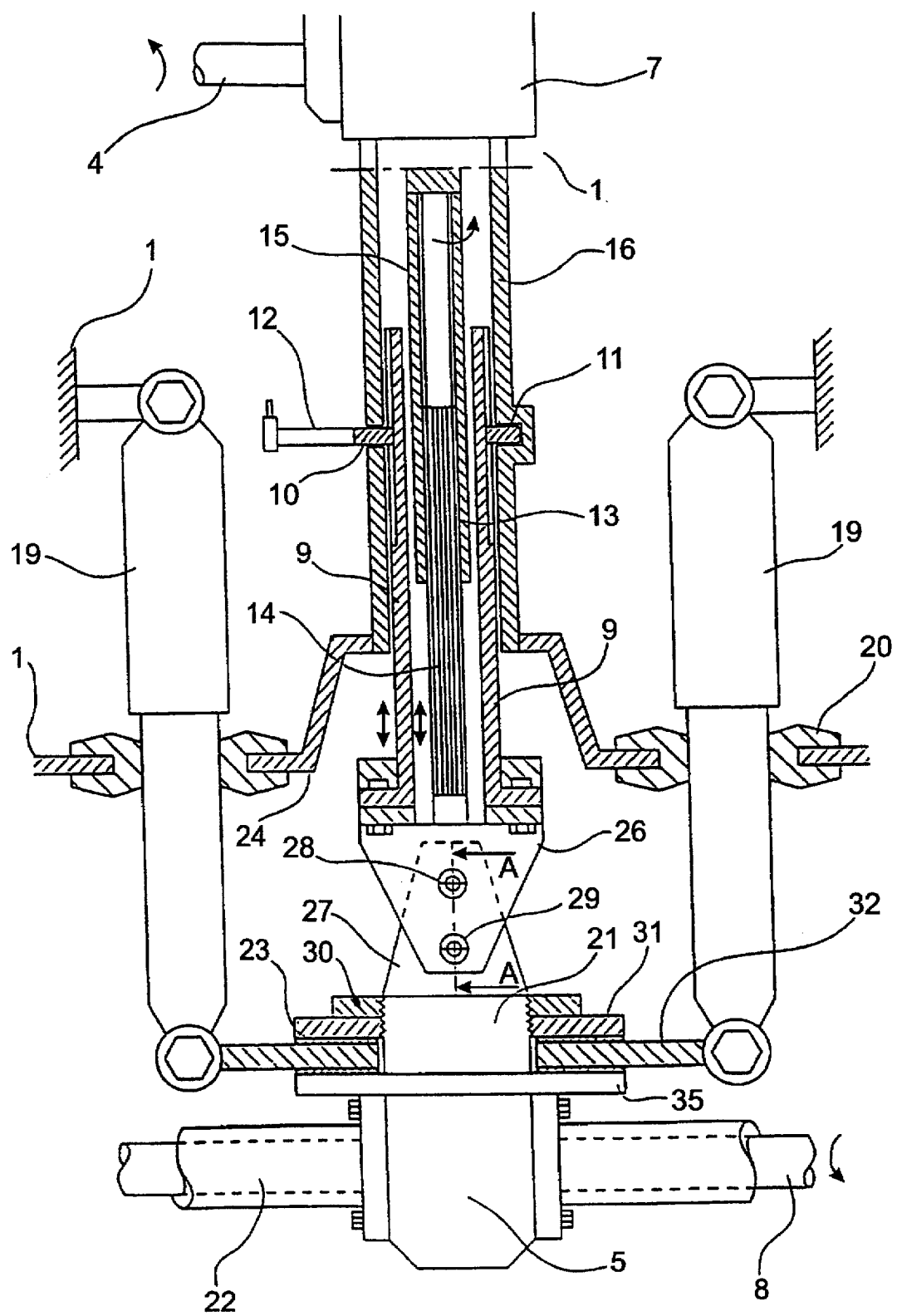
FIG. 2 shows schematically a vertical cross-section of a transmission and steering apparatus of the present invention as seen from the front.

FIGS. 1 and 2 show a transmission and steering apparatus according to the present invention. The apparatus includes a transmission shaft 4, a first bevel gear 5 connected with the drive shaft 8 of the front track unit 2, a second bevel gear 7 connected with the transmission shaft 4, and an intermediate shaft 13 between the bevel gears 5 and 7. By means of these members, the rotational motion of the motor 3 is transmitted to the common drive shaft of the front track units 2. The steering members of the apparatus comprise a steering shaft 9, a steering ring 10 and a steering lever 12 linked thereto. By means of these steering members, the steering motions of the vehicle, that is, turning of the handlebar, for example, is transmitted to corresponding turning motions of the front track units 2 for steering the tracked vehicle.

The front track units 2 mounted at both ends of the drive shaft 8 in the front part of the tracked vehicle function as the drive track unit of the tracked vehicle. The drive shaft 8 turns about the rotational axis of the intermediate shaft 13 and, in particular, about the rotational axis of the end part of the intermediate shaft 13 which is connected to the first bevel gear 5. The point about which the drive shaft turns is located at the intersection of the rotational axis of the intermediate shaft 13 and of the drive shaft 8, that is, in the first bevel-gear 5 in the center of the drive shaft 8.

FIG. 1 shows, seen from above, the motor 3 mounted on the frame 1 of the motor sled, the transmission shaft 4 and the second bevel gear 7 belonging thereto. The motor 3 rotates a primary variator (pulley) from which the rotational movement is transmitted via a V-belt to a secondary variator (pulley). The term "variator" refers to a transmission with a variable transmission ratio which is shown in FIG. 1 as V-belt pulley transmission gear between the motor 3 and shaft 6. A shaft 6 is fixedly coupled to the secondary variator (pulley). A gear wheel is mounted on the shaft so that it transmits force via a chain to a gear. The gear is mounted on the transmission shaft 4 so that the gear rotates the transmission shaft 4, on one end of which there is mounted the second bevel gear 7. The other end of the transmission shaft 4 is rotatably pivoted on the frame 1 of the sled.

FIG. 2 shows a vertical cross-section of a transmission and steering apparatus of the invention seen from the front of the sled. FIG. 2 shows the leading-through of the transmission and steering apparatus through the bottom plate 24 in the front part of the motor sled. A protective tube 16 defining steering shaft mounting means is attached, for example, by welding on the plate 24. One end of the tube 16 is mounted rigidly on the body of the second bevel gear 7. A circular recess 11 is made inside the protective tube 16 so that a steering ring 10 can freely turn in the recess 11. The recess has an opening for the movement of a steering lever 12. The steering lever 12 is rigidly attached to the steering ring 10, on the inside of which there are grooves for the longitudinal projections on the outside of the steering shaft 9. Hence, upon turning the steering ring 10 the steering motion is transmitted to the steering shaft 9. However, the steering shaft 9 can simultaneously move freely in vertical direction. The steering shaft 9 is fitted to move inside the protective tube 16 so that the upper part of the steering shaft 9 cannot touch the body of the second bevel gear 7.

In accordance with FIGS. 2 and 3, to the lower end of the steering shaft 9 there are rigidly fixed support plates 26 that are joined by means of fixed joining pins 28 and detachable locking pins 29 to underlying support plates 27. By removing the locking action of the locking pins 29, at least the support plates 27 can freely turn round the concentric gravitational axes of the joining pins 28. Neither is the operation of a cardan joint 17 prevented by the turning of the support plates 27. The support plates 27 are rigidly attached to the body 21 of the first bevel gear. On the round upper part of the first bevel gear are rigidly attached a lower annular support flange 35 and a detachable support flange 31. Between the support flanges 31 and 35 there is pivoted a mounting flange 32 for the suspension and the shock absorber so that it can freely rotate between the support plates 31 and 35 round the upper part of the body 21 of the first bevel gear 5. The support flange 31 and the mounting flange 32 are locked in place by a special locking nut.

The rotating steering motion of the steering shaft 9 in the transmission and steering apparatus of the invention turns the body 21 of the first bevel gear 5 and, being rigidly attached thereto by means of fixing elements, the protective tubes 22 of the drive shaft 8 whose motion in turn turns the front track unit 2. Due to the way the steering shaft 9 is mounted, the first bevel gear 5 can also move vertically. For dampening vertical movements and shocks of the first bevel gear 5, suspension and shock absorbers 19 are mounted on the mounting flange 32 defining the front track mounting means.

FIG. 2 shows schematically such shock absorbers 19, which also comprise a suspension element. Furthermore, for limiting the movement of the steering shaft 9 and for dampening abrupt vigorous shocks, a rubber cushion 20 is mounted on top of a fixed flange of the lower end of the steering shaft 9. The shock absorbers 19 are led through the bottom plate 24 of the sled and fixed by means of an auxiliary bar to the frame 1 of the sled. At the leading-through point, the shock absorbers 19 are protected by means of rubber collars fixed to the bottom plate 24 of the sled. The leading-through openings of the shock absorbers 19 are fitted to allow the lower ends of the shock absorbers 19 to move to such an extent as caused by the turning of the first bevel gear 5 round the joining pins 28. When it is desirable to prevent the first bevel gear 5 from turning round the joining pins 28 and thereby make the joint rigid, locking pins 29 must only be mounted in place and lock them in place with locking elements 36.

The transmission and steering apparatus of the present invention operates best when the first bevel gear 5 is capable of turning round the joining pins 28. In this case, for example, the suspension of the front track units is at its best since its elements are able to move according to the terrain changes in elevation, up and down, nearly independently of each other. The apparatus of the invention has to be provided with such shock absorbers which limit the vertical movement of the first bevel gear 5 suitably, taking into account the allowed vertical movements of the steering shaft 9 and the intermediate shaft 13.

As shown in FIG. 2, the second bevel gear 7 transmits the rotating motion of the transmission shaft 4 to the intermediate shaft 13. The intermediate shaft 13 is composed of two shafts 14 and 15 one within the other. The first intermediate shaft 14 is connected to the first bevel gear 5 and the second intermediate shaft 15 to the second bevel gear 7. The second shaft 15 is hollow and the first shaft 14 is fitted by means of a sliding slot joint to move freely in the longitudinal direction of the hollow shaft. At the lower end of the intermediate shaft 13, there is a cardan joint 17 which is situated inside the tilting joint 18.

The steering elements of the transmission and steering apparatus according to the present invention comprise a tubular steering shaft 9 with a circular cross-section. The steering shaft 9 surrounds the intermediate shaft 13, and is, at its lower part, connected to the drive shaft 8 for transmitting steering motions to the drive shaft 8. The steering elements additionally comprise a steering ring 10 for transmitting steering motions to the steering shaft 9. The steering ring 10 is fitted to the steering shaft to allow a longitudinal motion of the steering shaft 9 inside the steering ring 10. Steering motion from the handlebar of the motor sled is transmitted to the steering ring 10 by means of a steering lever 12. The steering shaft 9 is, at its lower end, connected to the drive shaft 8 via the tilting joint 18 for enabling a tilting motion. The steering shaft 9 is fitted to move inside the protective tube 16 which is rigidly fixed to the frame 1 of the tracked vehicle. The protective tube 16 includes a recess 11 for the steering ring 10. The springing motion of the track unit is possible because the intermediate shaft 13 enables a longitudinal springing motion and because the steering shaft 9 is able to move longitudinally inside the protective tube 16.

The steering shaft 9 and the intermediate shaft 13 are fitted to allow the steering shaft 9 to turn freely and move about the intermediate shaft 13. FIG. 3 shows how the intermediate shaft 13 is connected through the cardan joint 17 to the first bevel gear 5. Hence, the first bevel gear 5 can turn round the joining pins 28 of the tilting joint 18 if necessary. The first bevel gear 5 transmits the turning motion of the intermediate shaft 13 to the drive shaft 8 which rotates the drive wheels of the front track units 2.

FIG. 4 shows a schematic side view of a motor sled, wherein the skis have been replaced with driving and turning front track units 2 by utilizing the apparatus according to the invention. This kind of vehicle is superior as compared with motor sleds with skis or the like because it can move in the terrain both in summer and winter conditions.

The present invention is not limited to the above embodiment but it can be varied within the limits of the enclosed claims. For example, the steering shaft 9 can be connected to the first bevel gear 5 or the drive shaft 8 via any member which transmits the turning motion of the steering shaft 9 to a turning motion of the drive shaft 8. This member can be a folding joint which is connected to the steering shaft, on one hand, and to the drive shaft, on the other hand, and which transmits turning motion and allows a vertical motion of the intermediate shaft 13.

What is claimed is:

1. A tracked vehicle, comprising:
    a frame;
    a front track unit rotatably attached to front track mounting means and suspension means disposed between said front track mounting means and said frame so that said front track unit is movable in a vertical direction in relation to said frame;
    a vertically extending tubular steering shaft attached to said front track unit by a tilting joint, said steering shaft rotating said front track unit to steer the tracked vehicle, said steering shaft being connected to said frame with steering shaft mounting means so that said steering shaft is movable in a vertical direction in relation to said frame;

a first gear provided on said front track unit and a second gear provided on said frame, said first gear and said second gear transmitting driving power from said frame to said front track unit; and an intermediate shaft extending through said tubular steering shaft from said first gear to said second gear for transmitting said driving power therebetween, said intermediate shaft including at least two parts movable in relation to each other for lengthening and shortening said intermediate shaft along with relative movements between said front track unit and said frame.

2. A tracked vehicle according to claim 1, wherein said suspension means are shock absorbers.

3. A tracked vehicle according to claim 1, wherein said intermediate shaft includes a cardan joint.

4. A tracked vehicle according to claim 3, wherein said tilting joint is designed to accommodate said cardan joint.

5. A tracked vehicle according to claim 1, wherein at least one of said first gear and said second gear includes a bevel gear.

6. A tracked vehicle according to claim 1, wherein said intermediate shaft includes at least two parts, a first intermediate shaft part and a second intermediate shaft part movable relative to each other, permitting said intermediate shaft to lengthen and shorten following movements between said front track unit and said frame.

7. A tracked vehicle according to claim 6, wherein one of said first intermediate shaft part and said second intermediate shaft part is longitudinally movable within the other.

8. A tracked vehicle according to claim 1, wherein said steering shaft mounting means comprises a protective tube rigidly attached to said frame.

9. A tracked vehicle according to claim 1, wherein said tracked vehicle is a motor sled.

10. A tracked vehicle, comprising:
- a frame;
- a motor mounted on said frame;
- a front track unit;
- suspension means for connecting said front track unit to said frame, said suspension means permitting said front track unit to move in a vertical direction;
- front track mounting means attached to said front track unit for rotatably mounting said front track unit to said suspension means;
- a steering shaft interconnected with said front track unit for rotating said front track unit to steer said tracked vehicle;
- steering shaft mounting means for connecting said steering shaft to said frame, said steering shaft mounting means permitting said steering shaft to move in a vertical direction in relation to said frame; and
- an intermediate shaft, coaxial with said steering shaft and extending between said frame and said front track unit, for transmitting driving force from said motor to said front track unit, said intermediate shaft being capable of changing its length following movements between said front track unit and said frame.

11. A tracked vehicle according to claim 10, further comprising a first gear provided on said front track unit and a second gear on said frame.

12. A tracked vehicle according to claim 11, wherein said intermediate shaft includes at least two parts movable in relation to each other and extends between said first gear and said second gear.

13. A tracked vehicle according to claim 10, wherein said suspension means dampens relative movements of said front track mounting means and said front track unit relative to said frame of the vehicle in a vertical direction.

14. A tracked vehicle according to claim 10, wherein said steering shaft is hollow and said intermediate shaft is housed within said hollow steering shaft.

15. A combined driving and steering apparatus and a front track unit of a tracked vehicle, comprising:
- suspension means for connecting said front track unit to a frame of the tracked vehicle, said suspension means permitting the front track unit to move in a vertical direction;
- front track mounting means attached to the front track unit for rotatably mounting the front track unit to said suspension means;
- a steering shaft interconnected with the front track unit for rotating the front track unit to steer the tracked vehicle;
- steering shaft mounting means for connecting said steering shaft to the frame of the vehicle, said steering shaft mounting means permitting said steering shaft to move in a vertical direction in relation to said frame; and
- an intermediate shaft coaxial with said steering shaft and extending between the frame of the vehicle and the front track unit for transmitting driving force from the tracked vehicle to the front track unit, said intermediate shaft being capable of changing its length following movements between the front track unit and the frame.

16. A tracked vehicle according to claim 15, further comprising a first gear provided on the front track unit and a second gear on the frame, wherein said intermediate shaft extends between said first gear and said second gear.

17. A tracked vehicle according to claim 15, wherein said intermediate shaft includes at least two parts moveable in relation to each other.

18. A tracked vehicle according to claim 15, wherein said steering shaft is hollow and said intermediate shaft is housed within said hollow steering shaft.

19. A tracked vehicle according to claim 18, wherein said intermediate shaft includes at least two parts, a first intermediate shaft part and a second intermediate shaft part movable relative to each other, for permitting said intermediate shaft to lengthen and shorten with movements between said front track unit and said frame.

* * * * *